United States Patent Office 2,858,853
Patented Nov. 4, 1958

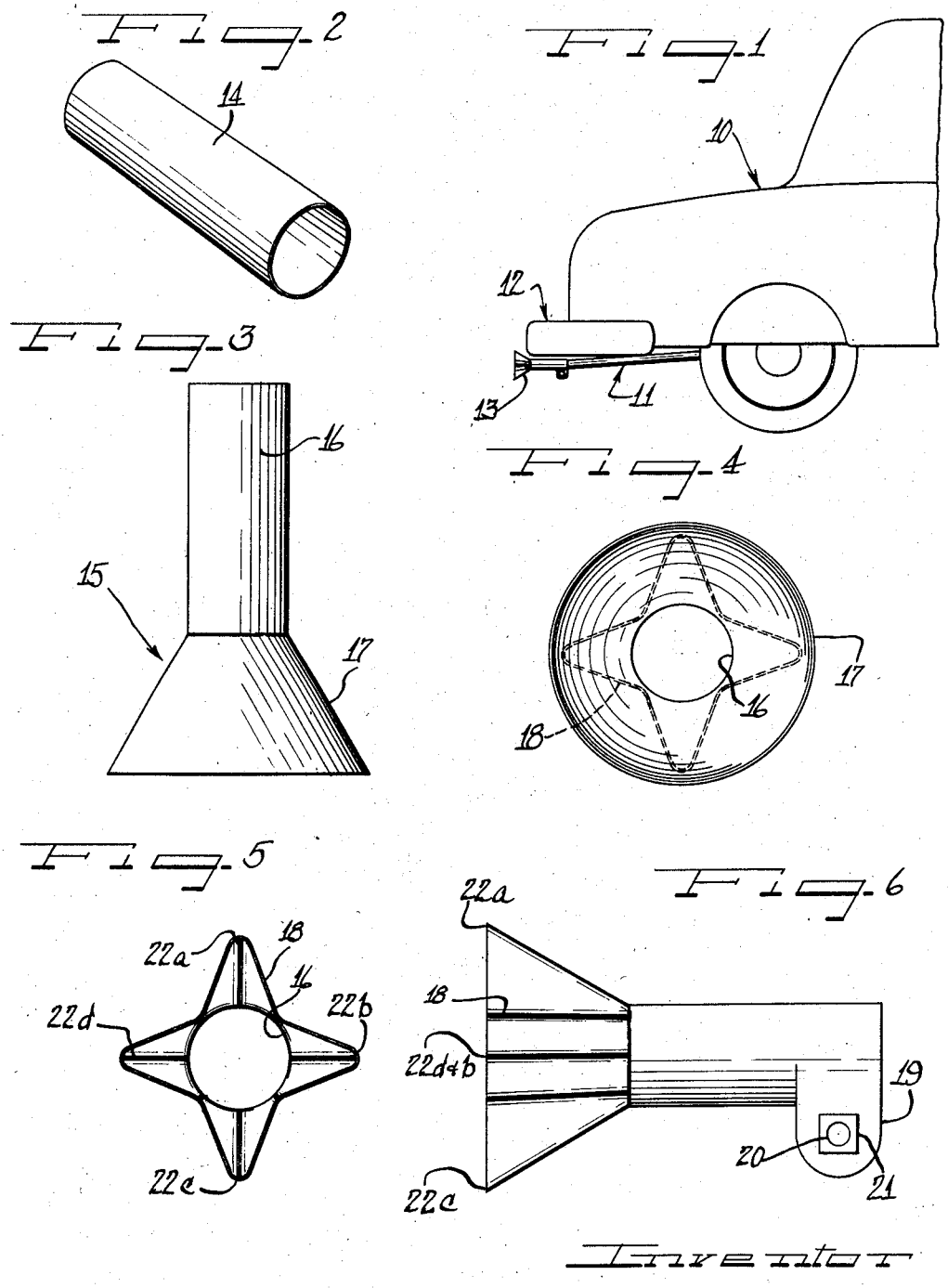

2,858,853

EXHAUST PIPE EXTENSION

George Albert Lyon, Detroit, Mich.

Application December 31, 1953, Serial No. 401,574

2 Claims. (Cl. 138—46.5)

This invention relates to an automobile exhaust pipe extension and more particularly to an ornamental extension member which may readily and quickly be assembled on the exhaust pipe of a motor vehicle.

Many arrangements have been provided in the past for enhancing the appearance of the end of the exhaust pipe of a motor vehicle. These arrangements, however, have not always been entirely satisfactory. It is important in constructing an exhaust pipe extension member to provide a member which will be ornamental in appearance, which will be rugged and reliable in use so that it will withstand the excessive vibrations of a vehicle while in motion, which is equipped with means permitting it to be readily and quickly mounted on the exhaust pipe, and which will be capable of quickly dispersing the hot corrosive gaseous exhaust vapors away from the rear bumper assembly.

It is therefore an object of this invention to provide a novel exhaust pipe extension member having outwardly flared flute portions extending from a tubular member, which telescopes over the exhaust pipe and is firmly secured thereon by suitable connecting means.

It is another object of this invention to provide a novel exhaust pipe extension member which is economical to manufacture, which is rugged and reliable in use, and which is equipped with means for quickly and firmly securing the member to an exhaust pipe.

It is a further object of this invention to provide a novel exhaust pipe extension member which may be economically formed from a single piece of tubular sheet metal stock.

According to the novel features of this invention, there is provided an exhaust pipe extension comprising a generally tubular member tapering toward an enlarged discharge end, the end having a plurality of spaced longitudinally extending flared flutes each of which defines an inwardly facing fluid conducting channel arranged to discharge fluid in a multiple of divergent directions about the axis of the member.

Other novel features which are believed to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

Figure 1 is a fragmentary side elevational view of the rear end of a motor vehicle, showing an outwardly flared exhaust pipe extension member embodying this invention applied thereto;

Figure 2 is a perspective view of a tubular metal blank illustrating the stock from which my novel flared exhaust member is progressively formed;

Figure 3 is a plan view of a partially formed funnel-shaped metal blank illustrating a second stage in the development of the novel flared exhaust member;

Figure 4 is an end view of the funnel-shaped blank illustrated in Figure 3, with the dotted lines illustrating the end of the novel exhaust member of my invention after it has been drawn through shaping dies into its final form;

Figure 5 is an end view of the novelly constructed flared and flutted exhaust member in its final form; and Figure 6 is a side elevational view illustrating the novel exhaust member of Figure 5 and showing means for firmly securing the exhaust extension member on an exhaust pipe.

As shown on the drawings:

Referring now to the specific embodiment of the invention illustrated by the various figures of the drawings, there is illustrated in Figure 1 the rear end of an automobile 10 which is equipped on its underside with the usual exhaust pipe 11.

Secured to the outer end of the exhaust pipe 11 and in spaced relationship to the rear bumper 12 is a flared and fluted extension member 13 which is constructed and formed in accordance with the teachings of the present invention.

In Figures 5 and 6 of the drawings, the extension member 13 is illustrated in detail whereas in Figures 2 to 4 I have shown how the member is progressively formed from tubular metal stock. As shown in these figures, the extension member 13 is formed from a cylindrical sheet metal blank 14 (Fig. 2). Subsequently, the cylinder is stamped by appropriate dies to form a funnel-shaped blank 15 (see Figure 3). The single blank 15 is comprised of two integral component portions, namely, the cylindrical portion 16 and the outwardly flared frusto-conical shaped portion 17.

After the cylindrical blank 14 has been formed into a funnel-shaped blank, it is drawn through suitable dies (not shown) and so as to compress its flared portion 17 inwardly into fluted form as illustrated by the dotted lines at 18 in Figure 4.

Referring now to Figures 5 and 6, the exhaust pipe extension member 13 is shown in its completed form. As is better seen in Figure 6, the member 13 is shown to have a split collar type of clamp 19, comprising two opposed tabs, oppositely aperatured so as to allow the passage therethrough of a bolt 20 by which, when tightly held by a nut 21, the exhaust extension member 13 may readily be held in position on the exhaust pipe 11.

While the exhaust pipe extension member 13 is shown as having a collar type securing means, it will be appreciated that this is an optional feature well known in the art and accordingly might be varied without departing from the novel scope of my invention.

It will, of course, be understood that the exhaust pipe extension member 13 may be given a high metal polish or otherwise suitably improved in appearance as by chromium plating, painting, enameling or the like.

The exhaust pipe extension member of the present invention has a distinctive advantage in facilitating the dispersion of corrosive exhaust fumes in such a manner as to assist in minimizing the discoloration and disfiguration of the bumper assembly. This is accomplished through the use of outwardly flared flutes 22a, 22b, 22c and 22d in the fluted end 18, as illustrated in Figures 5 and 6, and which discharge exhaust fumes in a multiple of divergent directions about the axis of the extension member.

From the foregoing description it will be apparent that I have provided an extraordinarily simple exhaust pipe extension member which is economical to manufacture, which is rugged and reliable in use, and which may readily be assembled on the end of an exhaust pipe by an unskilled person. It will further be understood from a cursory inspection of the various figures of the drawings that I have provided a fluted exhaust pipe extension which greatly enhances the general appearance of the rear part of an automobile, while assisting in protecting the rear bumper assembly from damage and deterioration by exhaust fumes.

Now, although I have shown a particular embodiment of my invention, it will, of course, be understood that I do not wish to be limited thereto, since many modifications may be made by those skilled in the art, and I therefore contemplate by the appended claims to cover all such modifications which fall within the true spirit and scope of my invention.

I claim as my invention:

1. As an article of manufacture, an exhaust pipe extension which is substantially tubular throughout its length, said extension having an open ended generally tubular portion for telescoping cooperation with the exhaust pipe of a vehicle, and an enlarged discharge end portion on one end of said tubular portion, said end portion comprised of a series of more than two equidistantly spaced symmetrically positioned generally radially and axially converging peaked flutes, each of said peaked flutes being progressively inclined longitudinally along and radially away from the axis of said extension and being of a progressively increasing cross sectional conformation with the side walls of said flutes diverging rearwardly and with said peaked flutes defining an inwardly facing fluid conducting channel arranged to discharge fluid in a multiple of divergent directions away from the axis of said member.

2. As an article of manufacture, an exhaust pipe extension which is substantially tubular throughout its length, said extension having an open ended generally tubular portion for telescoping cooperation with the exhaust pipe of a vehicle, and an enlarged discharge end portion on one end of said tubular portion, said end portion comprised of a series of more than two equidistantly spaced symmetrically positioned radially converging peaked flutes, each of said peaked flutes being progressively inclined longitudinally along and radially away from the axis of said extension with the side walls of said flutes diverging rearwardly and with said peaked flutes defining an inwardly facing fluid conducting channel arranged to discharge fluid in a multiple of divergent directions away from the axis of said member, said flutes extending generally from the junction of said portions and said portions comprising a single one-piece sheet metal stamping.

References Cited in the file of this patent

UNITED STATES PATENTS

| | | |
|---|---|---|
| D. 163,523 | Knight | June 5, 1951 |
| 107,603 | Faber | Sept. 20, 1870 |
| 457,803 | Vanorman | Aug. 18, 1881 |
| 1,069,335 | Johnson | Aug. 5, 1913 |
| 2,097,041 | Powell | Oct. 26, 1937 |
| 2,313,772 | Russell | Mar. 16, 1943 |
| 2,635,642 | Hobbs et al. | Apr. 21, 1953 |
| 2,664,700 | Benoit | Jan. 5, 1954 |

FOREIGN PATENTS

| | | |
|---|---|---|
| 568,140 | Great Britain | Mar. 20, 1945 |